United States Patent
Koinuma

(10) Patent No.: US 8,285,547 B2
(45) Date of Patent: Oct. 9, 2012

(54) AUDIO FONT OUTPUT DEVICE, FONT DATABASE, AND LANGUAGE INPUT FRONT END PROCESSOR

(75) Inventor: Atsushi Koinuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1196 days.

(21) Appl. No.: 11/395,235

(22) Filed: Apr. 3, 2006

(65) Prior Publication Data

US 2006/0235702 A1 Oct. 19, 2006

(30) Foreign Application Priority Data

Apr. 18, 2005 (JP) .................................. 2005-120376
Mar. 8, 2006 (JP) .................................. 2006-063238

(51) Int. Cl.
*G10L 21/00* (2006.01)

(52) U.S. Cl. ........ 704/260; 704/258; 704/270; 704/278; 381/56

(58) Field of Classification Search .................. 704/260, 704/268, 276, 254; 379/88.02; 455/567, 455/417

See application file for complete search history.

(56) References Cited

U.S. PATENT DOCUMENTS

| | | | | |
|---|---|---|---|---|
| 4,337,375 A * | 6/1982 | Freeman | ........................ | 704/260 |
| 5,454,062 A * | 9/1995 | La Rue | ........................ | 704/254 |
| 6,185,532 B1 * | 2/2001 | Lemaire et al. | ................ | 704/258 |
| 6,289,085 B1 * | 9/2001 | Miyashita et al. | ......... | 379/88.02 |
| 6,334,104 B1 * | 12/2001 | Hirai | ............................. | 704/258 |
| 6,941,342 B1 * | 9/2005 | Nelson | ........................... | 709/204 |
| 7,142,846 B1 * | 11/2006 | Henderson | ..................... | 455/417 |
| 2001/0024965 A1 * | 9/2001 | Hayashi | ........................ | 455/567 |
| 2002/0110248 A1 * | 8/2002 | Kovales et al. | ................. | 381/56 |
| 2003/0157968 A1 * | 8/2003 | Boman et al. | .................. | 455/563 |

FOREIGN PATENT DOCUMENTS

| | | |
|---|---|---|
| CN | 2147604 Y | 11/1993 |
| CN | 1197337 C | 4/2005 |
| JP | 4-362774 | 12/1992 |
| JP | 10-260815 | 9/1998 |
| JP | 2001-177668 | 6/2001 |
| JP | 2003-30183 | 1/2003 |
| JP | 2003-131992 | 5/2003 |
| JP | 2003-150507 | 5/2003 |
| JP | 2005-115443 | 4/2005 |
| WO | WO97/37344 | 10/1997 |

OTHER PUBLICATIONS

James Breen, "Multiple Indexing in an Eletronic Kanji Dictionary", 2004, p. 1-7.*
Japanese Office Action issued Jan. 4, 2011, in Patent Application No. 2006-063238.

* cited by examiner

*Primary Examiner* — Douglas Godbold
*Assistant Examiner* — Mark Villena
(74) *Attorney, Agent, or Firm* — Oblon, Spivak, McClelland, Maier & Neustadt, L.L.P.

(57) ABSTRACT

An audio font output device is disclosed that is able to effectively convert characters or text into an audio signal recognizable by the acoustic sense of human beings. The audio font output device includes a font data base that stores a character corresponding to a symbol code or picture data of a symbol, first audio data corresponding to the symbol code, a symbol display unit that displays the character corresponding to the symbol code or the symbol based on the picture data, and an audio output unit that outputs an audio signal based on the first audio data corresponding to the symbol code.

16 Claims, 19 Drawing Sheets

FIG.2

| character code | font data | audio data |
|---|---|---|
| 0020 | 0x00,0x05,⋯⋯ | 0x22,0x85,⋯⋯ |
| 0x70cf | 0x00,0x08,⋯⋯ | 0x01,0x85,⋯⋯ |
| 0x96e8 | 0x10,0x25,⋯⋯ | 0x82,0x35,⋯⋯ |
| 0x708e | 0x33,1x05,⋯⋯ | 0x22,0x96,⋯⋯ |
| | | |
| | | |
| | | |
| 0x6d77 | 0x85,0x05,⋯⋯ | 0x32,0x11,⋯⋯ |
| 0x8d70 | 0x00,0x02,⋯⋯ | 0x99,0x28,⋯⋯ |

FIG.4

| word code | font data | audio data |
|---|---|---|
| 0x00,0x05,・・・・・ | 0x00,0x05,・・・・・ | 0x22,0x85,・・・・・ |
| 2x00,3525,・・・・・ | 0x00,0x08,・・・・・ | 0x01,0x85,・・・・・ |
| 0x33,3568,・・・・・ | 0x10,0x25,・・・・・ | 0x82,0x35,・・・・・ |
| 0x56,0x05,・・・・・ | 0x33,1x05,・・・・・ | 0x22,0x96,・・・・・ |
| ⋮ | ⋮ | ⋮ |
|  |  |  |
|  |  |  |
| 0x02,3689,・・・・・ | 0x85,0x05,・・・・・ | 0x32,0x11,・・・・・ |
| 0x11,1x05,・・・・・ | 0x00,0x02,・・・・・ | 0x99,0x28,・・・・・ |

FIG.9

| word code | font data | audio data | preference level |
|---|---|---|---|
| 0x00,0x05,···· | 0x00,0x05,···· | 0x22,0x85,···· | 2 |
| 2x00,3525,···· | 0x00,0x08,···· | 0x01,0x85,···· | 1 |
| 0x33,3568,···· | 0x10,0x25,···· | 0x82,0x35,···· | 3 |
| 0c56,0c05,···· | 0x33,1x05,···· | 0x22,0x96,···· | 3 |
| ···· | ···· | ···· | ··· |
| ···· | ···· | ···· | ··· |

FIG.10A

Preference Setting

41 { Initial Character Selection
あ か さ た な ・・・・ ん

42

| あ | Word | Preference Level |
|---|---|---|
| | 受 | 3 |
| | 雨 | 2 |
| | ⋮ | ⋮ |

| い | Word | Preference Level |
|---|---|---|
| | 行く | 4 |
| | 犬 | 1 |
| | ⋮ | ⋮ |

43 End

FIG.10B

| Preference Setting | | |
|---|---|---|
| Preference Level | | |
| Noun | 1 | |
| Verb | 3 | |
| Adjective | 4 | |
| Adverb | 5 | |
| Imitative word | 2 | 43 End |

AUDIO FONT OUTPUT DEVICE, FONT DATABASE, AND LANGUAGE INPUT FRONT END PROCESSOR

BACKGROUND OF THE INVENTION

1. Field of the Invention

The present invention relates to an audio font output device, a font data base, and a language input front end processor, and particularly, to an audio font output device, a font data base, and a language input front end processor enabling output of both characters and an audio signal.

2. Description of the Related Art

When using a computer or other information processing device to display characters, the characters input by an input device, which converts the input characters into character codes, are displayed on a display. A user visually recognizes the input characters and understands the characters, words, or text.

Similarly, when displaying a file sent through a network on a display, the user visually recognizes the displayed characters in the file so as to understand the text in the file.

This is the usual way to understand displayed character information.

For example, Japanese Translation of International Patent Application WO1997/037344 (hereinafter, referred to as "reference 1") discloses a technique to read characters in a file, namely, to transform the characters in the file into voice so as to reduce the time to grasp the meaning of the text. Reference 1 discloses a text-voice converting device which prevents the generation of specific words, and converts text into audio signals.

Instead of only reading text, for example, Japanese Laid Open Patent Application No. 2003-150507 (hereinafter, referred to as "reference 2") discloses a technique that produces sounds specific to predetermined symbols when the predetermined symbols are input. In the technique of reference 2, when pictorial symbols are included in a file, while reading the characters in the file, the sounds are produced corresponding to the pictorial symbols in the file.

In addition, many other techniques have been put into practical use to produce voice based on the display of characters. For example, an input device such as a touch panel, which is operated by a weak key stroke, can sound each time a key is stroked.

However, in the technique of reference 1, which reads characters, that is, converts the characters into voice, sometimes it is difficult to grasp the meaning of the text if the user does not listen to the entire text. For example, if a sentence is a quite long, sometimes it is sufficient to just understand certain points (for example, the abstract) of the sentence. Further, when reading text with a device, if pauses are not appropriate between words or phrases, the user feels uncomfortable with the voice sound produced by reading the text. In this case, it is not so helpful to read the text while inputting the characters.

In the technique of reference 2, which produces sounds specific to pictorial symbols, sometimes the pictorial symbols have nothing to do with the meaning of the text; hence, the produced sound hinders understanding of the text. Further, when appropriate sounds are prepared in connection with the contents of the pictorial symbols in the text, due to the large number of types of sounds, the capacity of the memory for storing the sound data increases, and this increases the time to extract the appropriate sounds and increases the cost of the device. Further, when too many pictorial symbols and specific sounds are used, it may become difficult for the user to remember the corresponding relationships between the pictorial symbols and the specific sounds, and this makes the user feel inconvenienced.

In the technique of producing a sound each time a key is stroked, since the sound has nothing to do with the input characters or text, the sound cannot help the user to grasp the content of the input text.

SUMMARY OF THE INVENTION

It is a general object of the present invention to solve one or more of the problems of the related art.

A more specific object of the present invention is to provide an audio font output device able to effectively convert characters or text into an audio signal recognizable by the acoustic sense of human beings, and a font data base and a language input front end processor.

According to a first aspect of the present invention, there is provided an audio font output device, comprising: a font data base that stores a character corresponding to a symbol code or picture data of a symbol, and first audio data corresponding to the symbol code; a symbol display unit that displays the character corresponding to the symbol code or the symbol based on the picture data; and an audio output unit that outputs an audio signal based on the first audio data corresponding to the symbol code.

According to an embodiment of the present invention, it is possible to provide an audio font output device able to effectively convert characters or text into an audio signal recognizable by the acoustic sense of human beings.

Here, a "symbol" may be any object which can be displayed by a computer, such as a character, an alphabetic letter, a figure, and a pictorial symbol. Further, the symbol is not limited to a specific language, for example, the symbol may be a Japanese character, a Chinese character, or a Korean character.

As an embodiment, the audio font output device further comprises a sound source data generation unit that extracts the first audio data and generates first sound source data used for outputting the audio signal when the symbol code is input, wherein the audio output unit outputs the audio signal based on the first sound source data generated by the sound source data generation unit.

According to an embodiment of the present invention, it is possible to generate the sound source data based on the audio data; hence it is possible to store the audio data of a small size in the font data base.

According to a second aspect of the present invention, there is provided an audio font output device comprising: a font data base that stores a character corresponding to a symbol code or picture data of a symbol, and second audio data corresponding to a code of a word, said word being formed of plural characters and the symbol codes; a display unit that displays the character corresponding to the symbol code or the symbol based on the picture data; and an audio output unit that outputs an audio signal based on the second audio data corresponding to the word code.

According to an embodiment of the present invention, it is possible to provide an audio font output device able to effectively convert not only symbols but also words into an image, and output sound.

As an embodiment, the audio font output device further comprises a sound source data generation unit that extracts the second audio data corresponding to the word code and generates second sound source data used for outputting the audio signal when the word code is input, wherein the audio output unit outputs the audio signal based on the second sound source data generated by the sound source data generation unit.

According to an embodiment of the present invention, because the sound source data are generated based on the second audio data corresponding to the word code, it is possible to reduce the size of the audio data.

As an embodiment, the symbol code is input from a character input units, or the word code is input from a character input unit.

According to an embodiment of the present invention, each time a symbol (for example, a character) is input by using a character input device (for example, a key board), an audio signal corresponding to the symbol is produced and output. Here, the character input device can be any input device able to input any symbol.

As an embodiment, the symbol code is input from a data file of an application program, or the word code is input from a data file of an application program.

According to an embodiment of the present invention, when displaying a file, it is possible to output an audio signal while displaying the text.

As an embodiment, the audio font output device further comprises a language input front end processor that transforms a series of input symbol codes into a sentence including characters by using a dictionary.

According to an embodiment of the present invention, because of multiple functions of the language input front end processor, it is possible to produce and output an audio signal corresponding to a word with low workload and little degradation of processing speed.

As an embodiment, a preferential order of the words corresponding to the word codes is stored in the font data base, and the audio output unit outputs the audio signal in descending order of the preferential order of the words.

According to an embodiment of the present invention, because a preferential order of the words is stored in the font data base, it is possible to assign preferential order to output audio signals corresponding to the words; thus it is possible to grasp the meaning of the text easily.

As an embodiment, the audio font output device further comprises a signal reception unit that receives an electronic mail including the word code; and a determination unit that determines whether the second audio data corresponding to the word code included in the electronic mail are stored in the font database, wherein the audio output unit outputs the audio signal as a ring alert of the electronic mail based on the second sound source data when the second audio data corresponding to the word code included in the electronic mail are stored in the font database, and the audio output unit outputs the ring alert of the electronic mail when the second audio data corresponding to the word code included in the electronic mail are not stored in the font database.

According to an embodiment of the present invention, when an electronic mail arrives, since it is possible to generate sound source data based on words included in the electronic email, a user is able to be aware of or predict the contents of the electronic mail by the ring alert.

According to a third aspect of the present invention, there is provided a mail server that sends an electronic mail received from a signal transmission terminal through a network to a signal reception terminal through the network, said mail server comprising: a data base that stores audio data corresponding to a code of a word, said word being formed of plural characters and symbol codes; an audio data attaching unit that generates sound source data based on the audio data or extracts the sound source data corresponding to the word, and attaches the sound source data to the electronic mail; and a transmission unit that transmits the electronic mail with the attached sound source data to the signal reception terminal.

According to an embodiment of the present invention, because the mail server sustains the audio data and the sound source data, even when neither the signal transmission terminal nor the signal reception terminal has a mechanism to produce audio data, the signal reception terminal is able to output audio signals corresponding to the contents of the received text.

As an embodiment, the signal transmission terminal sends a request for attaching the sound source data to the electronic mail.

According to an embodiment of the present invention, when a request for attaching the sound source data is not sent together with the electronic mail, it is not necessary to send the sound source data to the signal reception terminal.

As an embodiment, the signal reception terminal rings based on the sound source data as a ring alert of the electronic mail when the received electronic mail has the sound source data attached.

According to an embodiment of the present invention, when an electronic mail arrives, since it is possible to generate sound source data based on words included in the electronic email, a user is able to be aware of or predict the contents of the electronic mail by the ring alert.

According to a fourth aspect of the present invention, there is provided a font data base comprising: a character corresponding to a symbol code or picture data of a symbol; and first audio data that corresponds to the symbol code.

As an embodiment, the font data base further comprises second audio data corresponding to a code of a word, said word being formed of plural characters and the symbol codes.

According to a fifth aspect of the present invention, there is provided a language input front end processor, wherein the language input front end processor transforms a series of input symbol codes into a sentence including characters by using a dictionary; and the dictionary includes audio data corresponding to a code of a word, said word being formed from plural characters and symbol codes.

According to the present invention, it is possible to provide an audio font output device able to effectively convert characters or text into an audio signal recognizable by the acoustic sense of human beings, and a font data base and a language input front end processor.

These and other objects, features, and advantages of the present invention will become more apparent from the following detailed description of preferred embodiments given with reference to the accompanying drawings.

BRIEF DESCRIPTION OF THE DRAWINGS

FIG. 2 is a table illustrating an example of the font data and audio data (described below) stored in the font data base;

FIG. 4 is a table illustrating an example of words stored in the dictionary of the front end processor;

FIG. 9 is a table illustrating an example of the dictionary of the front end processor according to a fourth embodiment;

FIG. 10A shows an example of a window displayed on the display for assigning preference;

FIG. 10B shows an example of a window displayed on the display for assigning preference by word class;

DESCRIPTION OF THE PREFERRED EMBODIMENTS

Below, preferred embodiments of the present invention are explained with reference to the accompanying drawings.

First Embodiment

In the present embodiment, a character is displayed each time a character code is generated, and at the same time, a specific sound is produced. In this way, when a user inputs characters, sounds specific to the characters are generated by the input device, and by just hearing the sounds, the user can predict or understand the meaning of the characters or a sentence.

Figure 1:
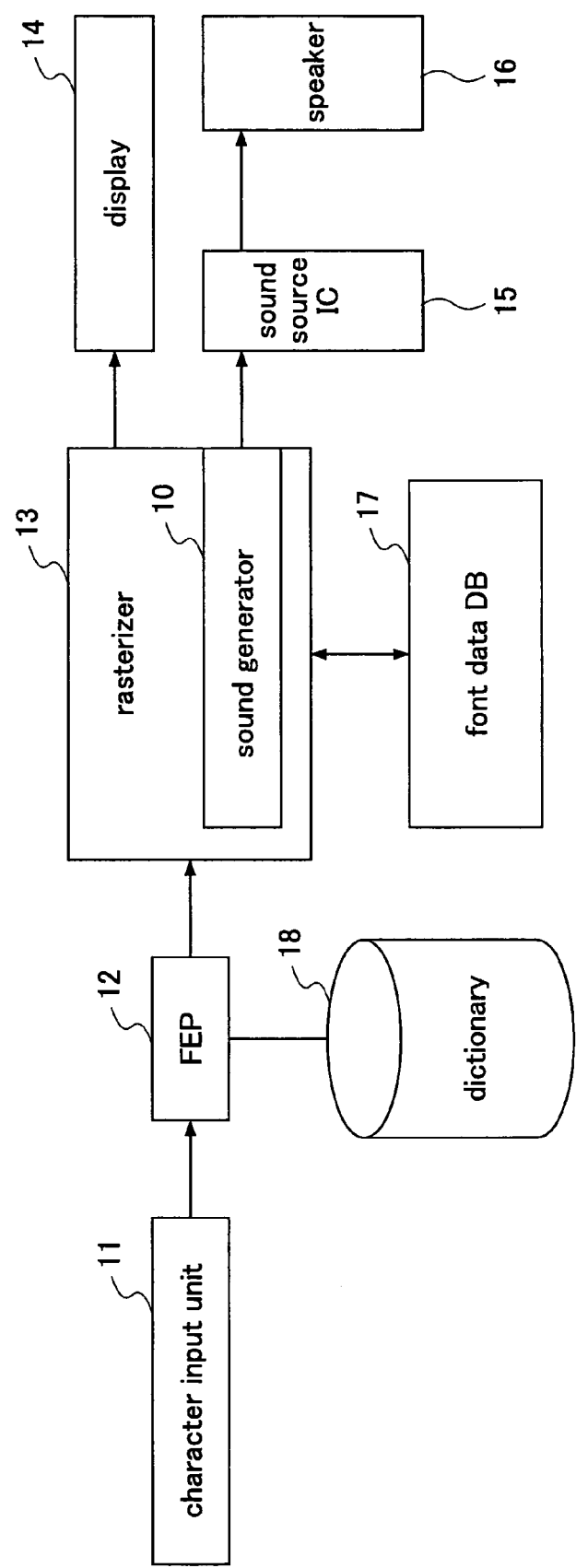
FIG. 1 is a block diagram exemplifying an audio font output device according to a first embodiment of the present invention.

FIG. 1 is a block diagram exemplifying an audio font output device according to a first embodiment of the present invention.

As illustrated in FIG. 1, the audio font output device of the present embodiment includes a character input unit 11, a front end processor (FEP) 12 having a dictionary 18, a rasterizer 13 having a sound generator 10, a display 14, a sound source 15, a speaker 16, and a font data base (DB) 17.

For example, the character input unit 11 is a key board, and a user can input characters into a computer by stroking keys of the key board with fingers. For example, in the key board, plural keys are arranged representing English letters, kana (the Japanese syllabary), figures, symbols, and others. When the user strokes a key, a code (for example, an ASCII code) corresponding to the key is sent to the computer. Several characters can be assigned to one key. For example, one key can represent both a letter "A" and a kana "chi". These characters assigned to one key can be selected by combination usage of a "shift" key, a "Ctrl" key, or other auxiliary keys, or by selecting the input mode.

The character input unit 11 is not limited to a key board, but can be various other types of devices. For example, it may be any device that generates a key code corresponding to an input character, a touch panel, a hand-writing input device, or an audio key board.

The key code is transformed into character code by a BIOS (Basic Input Output System), and is sent to the front end processor 12.

The front end processor 12 transforms a series of input character codes into a character of a language, such as Japanese or Chinese.

For example, when letters "K", "U", "R", "U", "M", "A" are input through the character input unit 11, the front end processor 12 makes reference to the dictionary 18 and transforms the series of letters "K", "U", "R", "U", "M", "A" into three Japanese kanas by using a specific character code system, and then, the user selects a Japanese character representing a "car" from several Japanese characters corresponding to the same three Japanese kanas, and the character code of the selected Japanese character meaning "car" is generated.

There are several kinds of character code systems, such as JIS code, Shift code, Unicode, and others. In the present embodiment, any one of these code systems can be used.

The character code of the selected Japanese character meaning "car" is sent to the rasterizer 13. The rasterizer 13 generates a number of dots to express the character corresponding to the character code so as to display the character on the display 14. The rasterizer 13 includes the font data base 17 in which font data corresponding to character codes are stored.

FIG. 2 is a table illustrating an example of the font data and audio data (described below) stored in the font data base 17.

The font data are stored in the font data base 17 in connection with the character codes. The font data include positional coordinates of points, parameters of equations of lines or planes passing through the points, and drawing information such as color filling.

The rasterizer 13 includes the sound generator 10. The sound generator 10 generates sound source data based on the audio data shown in the table in FIG. 2, so as to output a sound corresponding to the input character code through the speaker 16.

As shown in FIG. 2, the audio data are stored in the font data base 17 in connection with the character codes. The audio data include musical information indicating intervals, lengths, strength, and variation pattern in the duration of each sound.

The sound generator 10 extracts the audio data corresponding to the input character code, and generates sound source data based on the audio data, such as FM sound source data, PCM sound source data, and MIDI (Musical Instrument Digital Interface).

The audio data includes data producing a sound reminding the user of the corresponding characters. For example, the audio data associated with the word "car" produces a sound effect of a running car, the audio data associated with the word "bird" produces a sound effect of a singing bird, the audio data associated with the word "rain" produces a sound effect of raining, the audio data associated with the word "flame"

produces a sound effect of burning, the audio data associated with the word "sea" produces a sound effect of a wave, and the audio data associated with the word "run" produces a sound effect of running.

These audio data are stored in the font data base 17.

Thus, the sound generator 10 generates sound source data to produce a sound effect of an input character.

The sound source data generated by the sound generator 10 is sent to the sound source IC 15.

The sound source IC 15 produces sounds of tones determined by the audio data. The sounds are amplified by an amplifier, and are output through the speaker 16.

In should be noted that the sound source data can be stored in the font data base 17 functioning as the audio data. In this case, the sound source data are directly sent to the sound source IC 15 to output sounds. In addition, when the sound source data are not appropriate for the sound source IC 15, the sound generator 10 changes the sound source data to fit the sound source IC 15.

With the audio font output device configured as described above, the audio font output device outputs a sound each time an input character is displayed.

Figure 3:
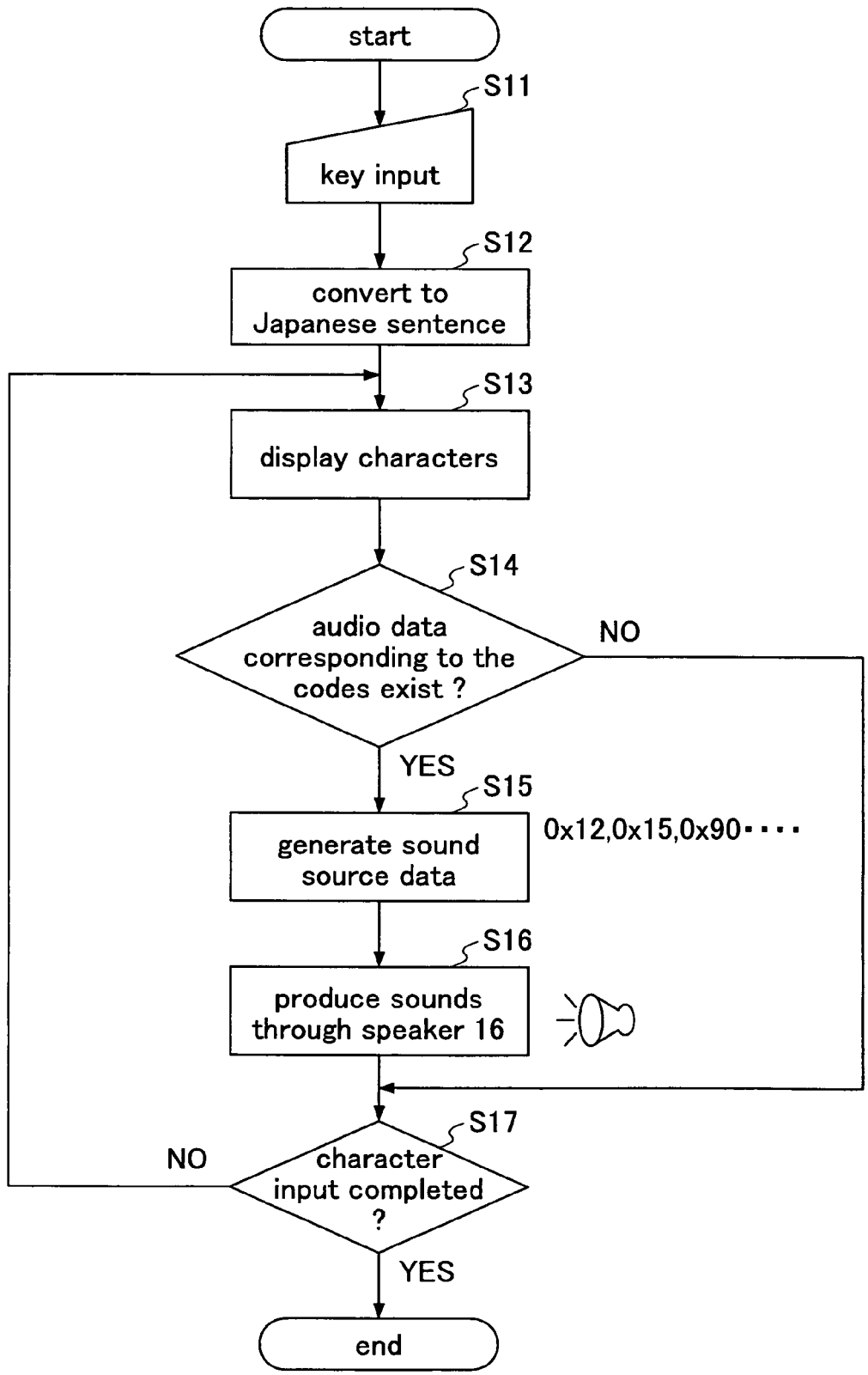
FIG. 3 is a flowchart illustrating operations of outputting a sound when an input character is displayed.

FIG. 3 is a flowchart illustrating operations of outputting a sound when an input character is displayed.

As shown in FIG. 3, in step S11, a user inputs character strings through the character input unit 11, just as in the related art, in which the input character strings are displayed on the display 14.

For example, the user inputs a character string "K", "U", "R", "U", "M", "A", "D", "E", "I", "K", "U", "Y", "O" through the character input unit 11.

In step S12, the front end processor 12 converts the input character string into a Japanese sentence, which means "Let's go by car", based on codes of the above input characters, and generates codes of the characters included in the Japanese sentence. Specifically, the front end processor 12 generates the codes "3c56", "2447", "3954", "242F", and "2468" of the Japanese sentence. For example, the above character codes are JIS codes.

The front end processor 12 sends the codes "3c56", "2447", "3954", "242F", and "2468" of the Japanese sentence to the rasterizer 13.

In step S13, the rasterizer 13 extracts the font data corresponding to the received codes from the font data base 17, and displays characters corresponding to the codes one by one on the display 14 with each character as an aggregation of dots.

In step S14, the sound generator 10 searches the font data base 17 to determine whether audio data corresponding to the codes from the front end processor 12 exist in the font data base 17.

If the desired audio data exist in the font data base 17, the routine proceeds to step S15.

If the desired audio data do not exist in the font data base 17, the routine proceeds to step S17.

In step S15, the sound generator 10 extracts the audio data corresponding to the input character codes, and generates sound source data based on the audio data.

For example, sound source data are generated from the audio data "0x12", "0x15", "0x90", so that a sound effect of a running car is produced for the word "car".

In step S16, receiving the sound source data, the sound source IC 15 produces sounds through the speaker 16.

In step S17, if input of the characters is not finished, the routine returns to step 13, and the audio font output device repeats the process from step S13 through step S17 until all of the characters are input.

It is not necessary to produce the sound effects for each word. For example, the sound source data of the words included in one sentence can be stored for a while, and the sounds of all words in the sentence can be output in order after the whole sentence is displayed.

According to the present embodiment, each time a character is input, a specific sound reflecting the meaning of the character is produced; thus the user can predict the contents of the text without looking at the display 14. Because audio data and font data are stored as control data, which have very small size, the required capacity of memory is greatly reduced compared to storage of sound files (WAVE or MP3). Therefore, the audio font output device can be easily installed in a cellular phone, a PDA (Personal Digital Assistant), or other portable terminals.

Modification

In the above example, the audio data are stored in the font data base 17 in connection with the character codes, as shown in FIG. 2.

The audio data may also be stored in the font data base 17 in connection with codes of words, each of which has a certain meaning.

FIG. 4 is a table illustrating an example of words stored in the dictionary 18 of the front end processor 12.

Each of the words may be a noun, a verb, an adjective, or others. Below, primarily nouns are used as examples.

In the dictionary 18, the font data and audio data are stored in connection with the codes of words. The code of a word, for example, "noodle", is used to represent "noodle", and includes codes of characters "n", "o", "o", "d", "l", and "e". The font data, the same as those shown in FIG. 2, include positional coordinates of points, parameters of equations of lines or planes passing through the points, and drawing information such as color filling.

The audio data are stored in connection with the word codes. The audio data include musical information indicating intervals, lengths, strength, and variation pattern for the duration of each sound to remind the user of the corresponding words.

For example, the audio data associated with the word "noodle" produces a sound effect of eating noodles, the audio data associated with the word "typhoon" produces a sound effect of strong wind, the audio data associated with the word "bird" produces a sound effect of a singing bird, the audio data associated with the word "bicycle" produces a sound effect of a bicycle engine, the audio data associated with the word "train" produces a sound effect of a running train, and the audio data associated with the word "clock" produces a sound effect of an operating clock.

Because the front end processor 12 sends the audio data corresponding to the words to the sound generator 10, the sound generator 10 generates sound source data based on the audio data. In addition, the rasterizer 13 displays text including words or other characters on the display 14, and the sound source IC 15 produces sounds based on the audio data.

According to the modification of the present embodiment, specific sounds reflecting the meaning of words in a text are produced; thus the user can easily grasp the contents of the text without looking at the display 14.

Note that in addition to the sounds of words, the sound of each character may also be output.

Second Embodiment

In the previous embodiment, descriptions are made of outputting sounds corresponding to input characters or words when inputting text.

In the present embodiment, descriptions are made of outputting sounds corresponding to input characters or words when displaying text on a display.

In the following, the same reference numbers are assigned to the same elements as those described previously, and overlapping descriptions are omitted.

Figure 5:
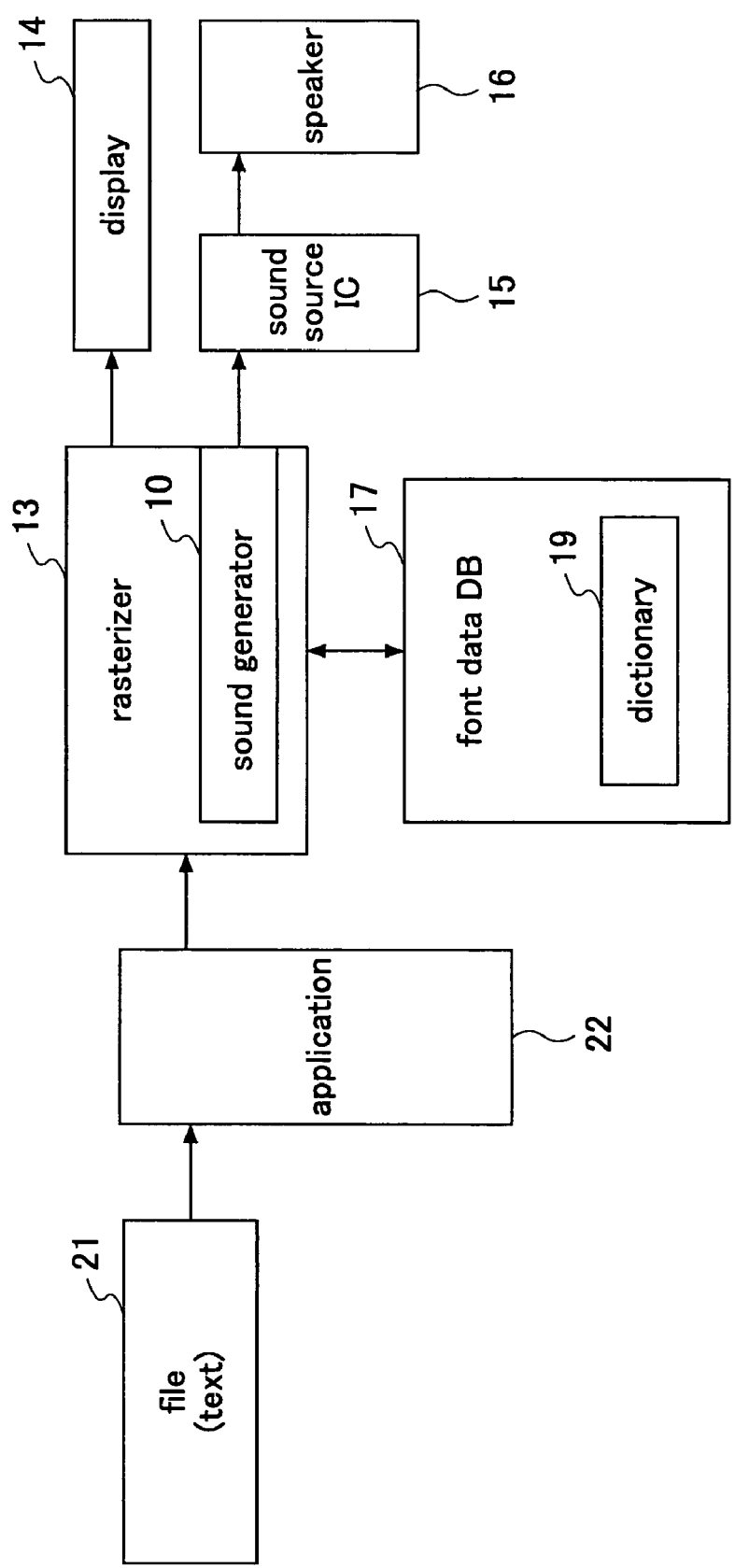
FIG. 5 is a block diagram exemplifying an audio font output device according to a second embodiment of the present invention.

FIG. 5 is a block diagram exemplifying an audio font output device according to a second embodiment of the present invention.

As illustrated in FIG. 5, the audio font output device of the present embodiment includes a rasterizer 13 having a sound generator 10, a display 14, a sound source 15, a speaker 16, and a font data base (DB) 17 having a dictionary 19.

Data input to the audio font output device are from an input file 21, and the file 21 is first input to an application program 22.

The dictionary 19 is the same as that shown in FIG. 4.

For example, the file 21 may be a data file of various formats, may include text, and is used in word processor software, presentation software, electronic mail software, spreadsheet software, or browser software. The file 21 may be input to the application program 22 via an optical disk or another storage medium, or may be received via a network. The file 21 is associated with a predetermined application program 22, and the application program 22 extracts the text included in the file 21. The application program 22 forms a window or a frame, displays icons and menus on the display 14, and at the same time transmits the extracted text to the rasterizer 13.

The rasterizer 13 extracts the font data corresponding to the characters constituting the text from the font data base 17, and displays the characters of a specified size at positions specified by the application program 22 with each character as an aggregation of dots.

Similarly, the sound generator 10 extracts the audio data corresponding to the characters constituting the text from the font data base 17, and generates sound source data based on the audio data. In the text, if there are plural characters having the same audio data, the sound source data are generated in order of appearance, and are stored sequentially.

The audio data are stored in the font data base 17 in connection with the words in the dictionary 19.

The sound generator 10 extracts the audio data corresponding to the characters constituting the text from the font data base 17.

The sound source IC 15 outputs the thus generated sound source data sequentially through the speaker 16.

With the above configuration, the audio font output device outputs sounds while displaying characters in the input file 21.

Figure 6:
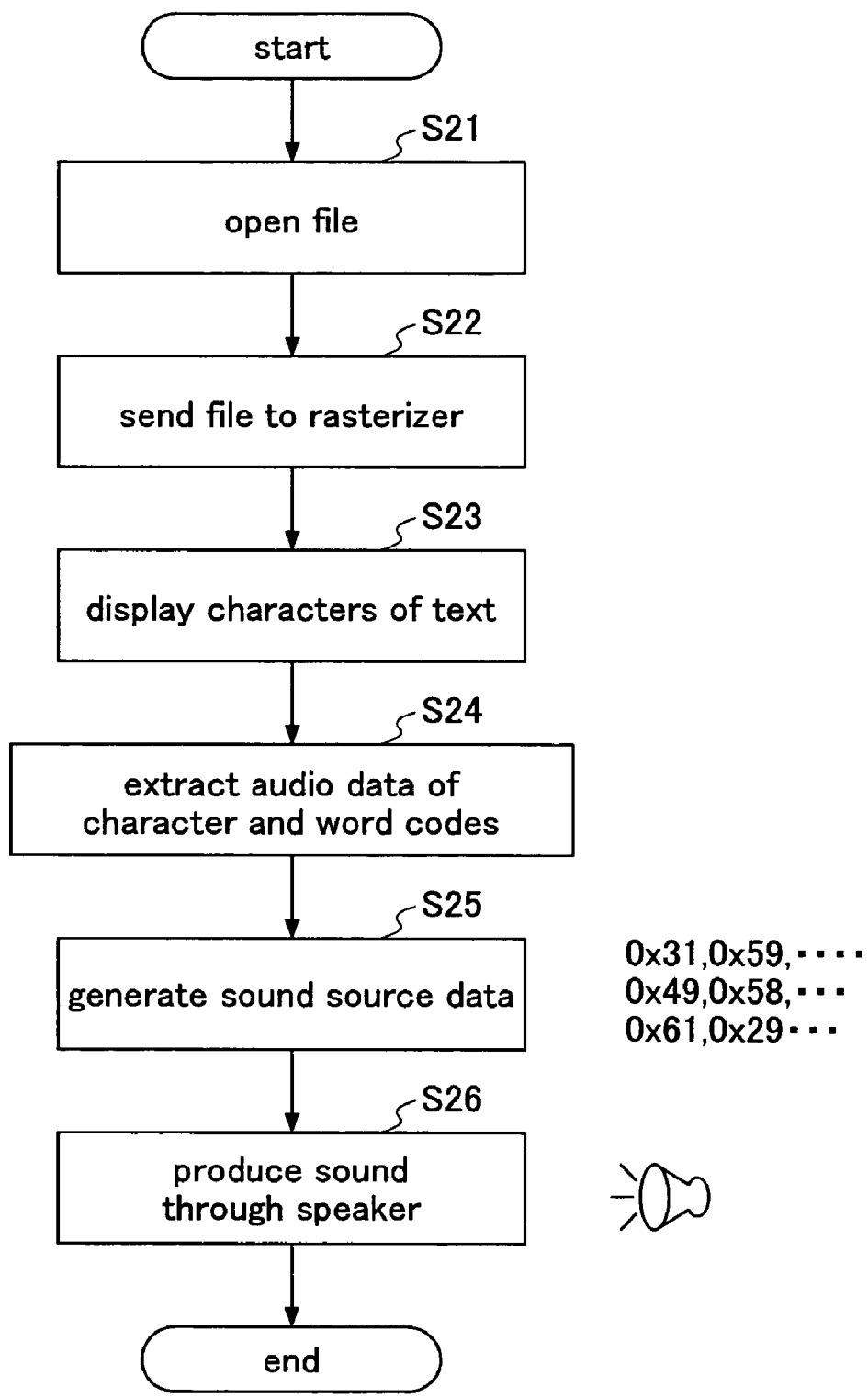
FIG. 6 is a flowchart illustrating operations of outputting sounds while displaying characters in an input file.

FIG. 6 is a flowchart illustrating operations of outputting sounds while displaying characters in an input file.

As shown in FIG. 6, in step S21, the application program 22 is invoked, the file 21 is received and is loaded, and then the file 21 is opened.

For example, the application program 22 is an electronic mail application, and when an electronic mail is opened, the audio font output device of the present embodiment starts to operate.

Figure 7:
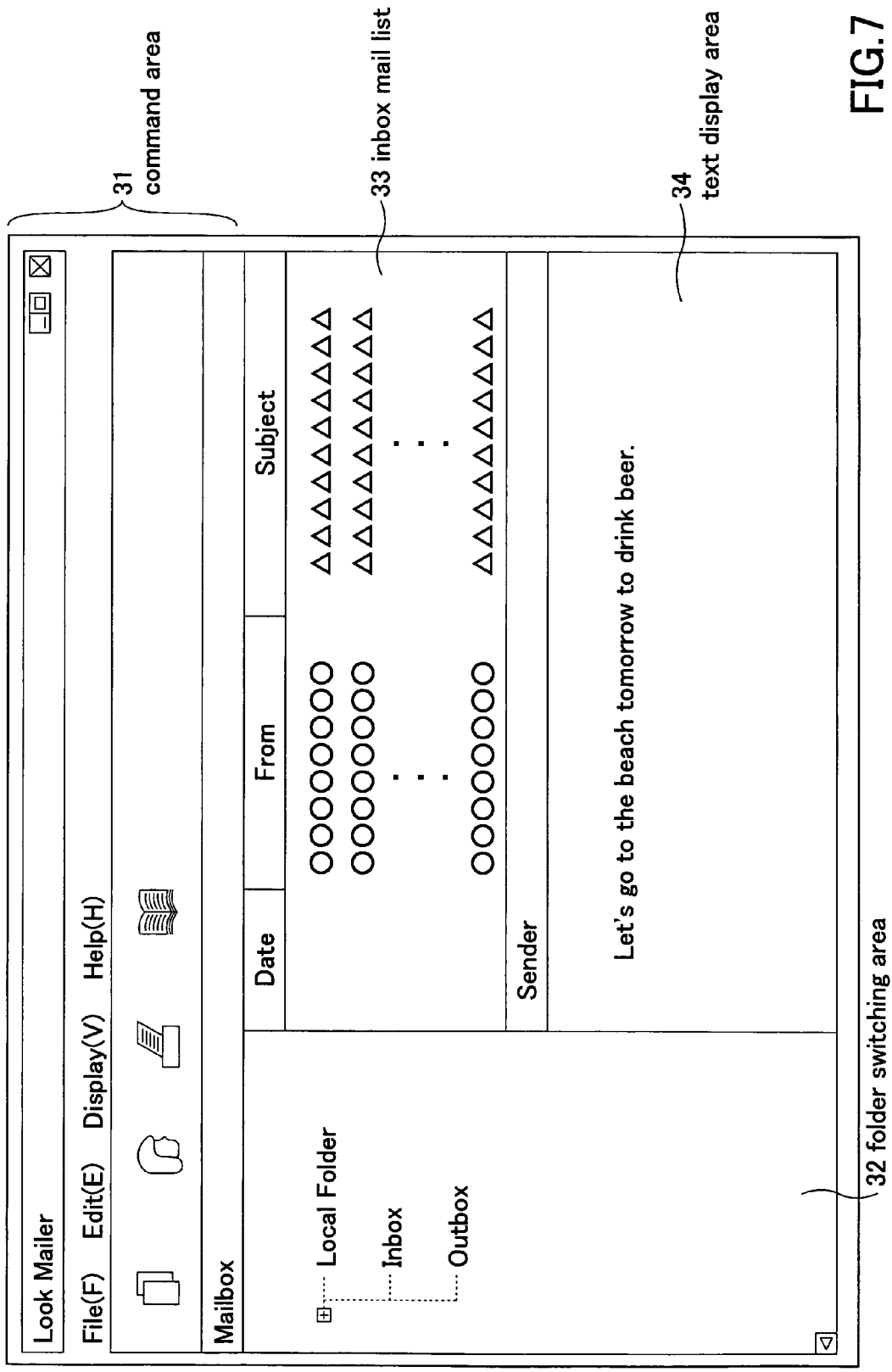
FIG. 7 shows an example of a window displayed on the display when the electronic mail application is started.

FIG. 7 shows an example of a window displayed on the display 14 when the electronic mail application is started.

As shown in FIG. 7, the electronic mail includes a command area 31, a folder switching area 32, an inbox mail list 33, and a text display area 34.

In step S22, for example, a user selects a mail from the inbox mail list 33 with a mouse, and the codes of the characters included in the text of the file 21, namely, the selected mail, are sent to the rasterizer 13. For example, the character string in the text of the file 21 reads "Let's go to the beach tomorrow to drink beer!".

In step S23, the rasterizer 13 extracts the font data of the codes of the characters in the sentence "Let's go to the beach tomorrow to drink beer!" from the font data base 17, and forms the corresponding characters of a specified size with each character as an aggregation of dots, and displays the characters one by one on the text display area 34.

In step S24, the sound generator 10 extracts the audio data corresponding to the codes of the characters in the sentence "Let's go to the beach tomorrow to drink beer!" from the font data base 17, and extracts the audio data of the words in the sentence from the dictionary 19. For example, the audio data of the words "beach", "drink", and "beer" are extracted.

In step S25, the sound generator 10 generates sound source data based on the audio data of the words "beach", "drink", and "beer".

For example, sound source data are generated from the audio data of the words "beach", "drink", and "beer" so that a sound effect of a sea breeze is produced for the word "beach", a sound effect of drinking is produced for the word "drink", and a sound effect of drinking beer is produced for the word "beer".

In step S26, receiving the sound source data, the sound source IC 15 produces sounds through the speaker 16.

According to the present embodiment, it is possible to produce sounds for characters or words included in a file created beforehand. As in the present embodiment, because sounds are produced for an electronic mail, the user can easily grasp the contents of the electronic mail, and the contents of the electronic mail are transmitted making acoustic sense. That is, one is reminded of the feeling of going to the beach and the taste of beer, thus transmitting the contents of the electronic mail with a highly realistic sensation.

In addition, for example, when using a presentation application, if the audio font output device of the present embodiment is applied, it is possible to emphasize "achievement", "effect" by displaying these words while producing sound effects to effectively present the contents of the presentation to the audience.

Third Embodiment

In the present embodiment, changing settings of an audio font output device is described.

As described in the previous embodiment, by using the audio font output device of the present invention, it is possible to effectively express the contents of text by sounds. However, for example, in a library, it is sometimes not allowed to output sound. In the present embodiment, setting ON or OFF various operations of an audio font output device is described.

Figure 8:
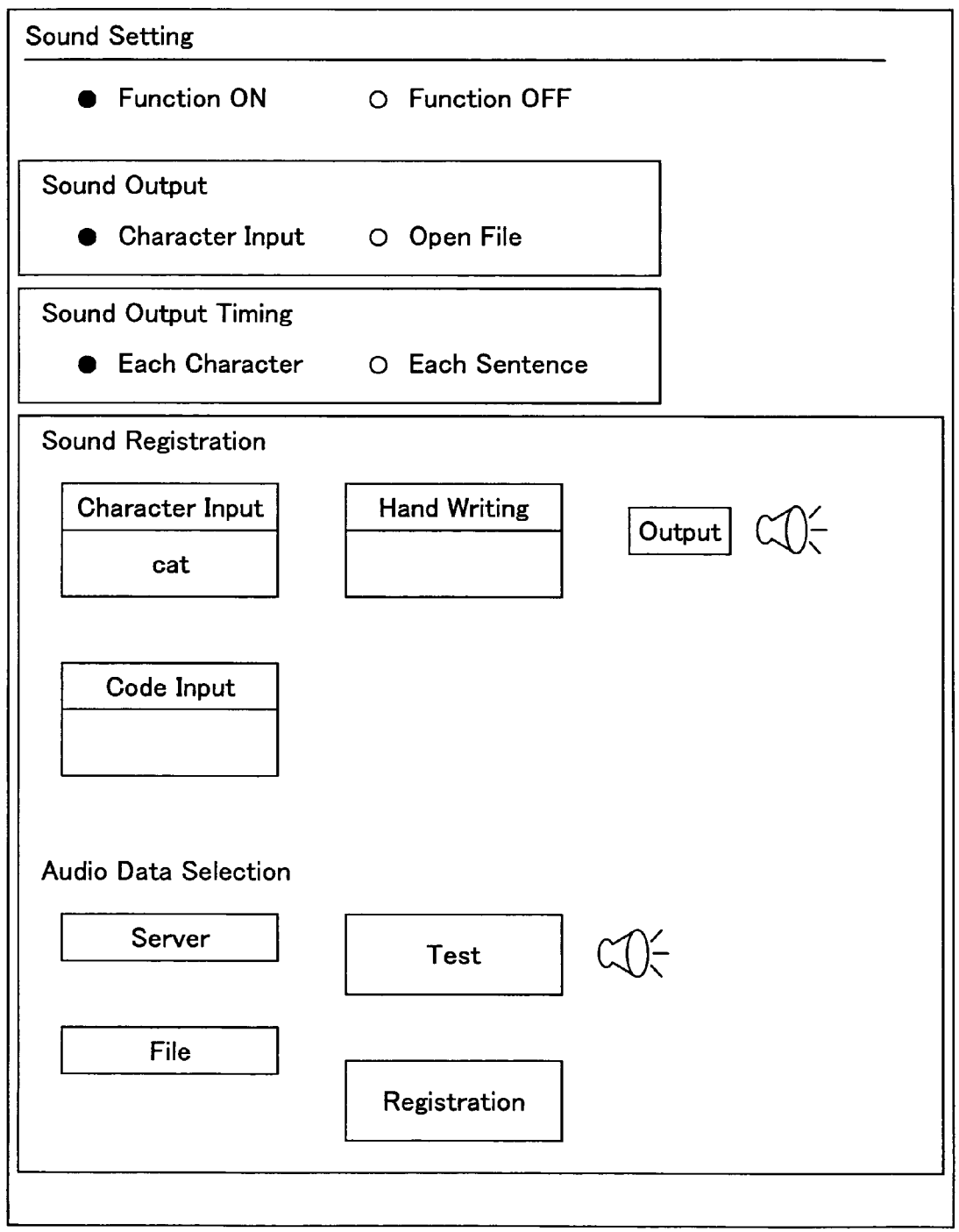
FIG. 8 shows an example of a window for setting an audio font output device according to a third embodiment of the present invention.

FIG. 8 shows an example of a window for operating an audio font output device according to a third embodiment of the present invention.

In the present embodiment, for example, the audio font output device can be started by clicking a tool bar on the display 14.

The user can select a "Function ON" button or a "Function OFF" button using a mouse to select whether a sound is to be output.

In a "Sound Output" zone, a "Character Input" button selects whether a sound is output when a character is input, and an "Open File" button selects whether a sound is output when a file is opened.

In a "Sound Output Timing" zone, an "Each Character" button selects whether a sound is output for each character, and an "Each Sentence" button selects whether sounds are output for each sentence.

Specifically, when the "Every Character" button is selected, a sound is output each time a character is displayed, and when the "Every Sentence" button is selected, sounds of the characters in the sentence are output sequentially each time a sentence is input, for example, after a period is input.

Further, selection in the "Sound Output Timing" zone is allowed only when the "Character Input" button in the "Sound Output" zone is selected.

In a "Sound Registration" zone, the user is allowed to register desired audio data to be associated with characters or words. For example, the user can input a desired character in a "Character Input" box, or a "Code Input" box, or a "Hand Writing" box. Then, by clicking an "Output" button, the user can output the sound to test the sound effect. If the user is satisfied with the sound effect and the audio data have not been registered yet, the user can register the audio data in the following "Audio Data Selection" zone. If the user is not satisfied with the sound effect, the user just does not click a "registration" in the following "Audio Data Selection" zone.

In the "Audio Data Selection" zone, "Server" and "File" for storing the registered audio data are provided. The user can download the audio data from the "Server", or read out the audio data from the "File".

The use can click a "Test" button to test the candidate sound, and if the user is satisfied with the sound effect, the user can click the "registration" button to register the audio data as the audio data of the input character.

According to the present embodiment, the user can change settings of the audio font output device in various ways and can register desired audio data.

In addition, the user can effectively grasp the contents of characters and text with acoustic sense. Because the audio data are stored as control code, which have a very small size, the required capacity of memory is greatly reduced, and thus the audio font output device can be easily installed in a portable terminal.

Because the audio font output device outputs sounds not only when characters are input from an input device but also when a file is opened, the user can easily grasp the contents of the file.

Fourth Embodiment

In the second embodiment, it is described that sounds corresponding to characters or words are output when displaying text including the characters or words on a display.

In the present embodiment, outputting the sounds sequentially in order of preference level is described.

The audio font output device of the present embodiment is basically the same as that in FIG. 5, except that in the dictionary 19, the audio data are assigned with preference levels in addition to correspondence with words.

In the following, the same reference numbers are assigned to the same element as those described previously, and overlapping descriptions are omitted.

FIG. 9 is a table illustrating an example of the dictionary 19 of the font database 17 (FIG. 5) according to a fourth embodiment.

In FIG. 9, the preference is indicated by integers, where "1" corresponds to the highest preference and a greater number corresponds to a lower preference.

When a text includes plural characters, the sound generator 10 stores all audio data or sound source data beforehand, and outputs the audio data or the sound source data sequentially through the speaker 16 in descending order of preference level.

Below, definition of the preference is described.

For example, the preference is defined to have 3 or more levels, at most 10 levels, and the user can freely assign the preference to a word.

FIG. 10A shows an example of a window displayed on the display 14 for assigning preference.

In the present embodiment, similar to the third embodiment, the audio font output device is started by clicking a tool bar on the display 14. Then, the user invokes a program for selecting preference, and the program reads out words and preference from the dictionary 19 shown in FIG. 9.

In FIG. 10A, in the preference setting window, there are an "initial character selection" area 41 for selecting the initial character of a word, and a preference setting table 42 for setting the preference levels of the selected initial character and the word having the initial character. For example, in FIG. 10A, the selected initial character is a Japanese kana "a".

In the preference setting table 42, Japanese words with Japanese kanas "a", "i", "u", "e", "o" as initial characters are listed in order. Beside the Japanese words, there is a column for inputting the preference levels, and the user may input FIGS. 1 to 10 as desired in the column as the preference levels.

After inputting the preference levels, the user clicks an "End" button, and the preference setting program stores the input preference level values in the dictionary 19.

In this way, the user can assign any preference levels as desired to words.

The preference level may also be assigned according to word class.

FIG. 10B shows an example of a window displayed on the display 14 for assigning preference by word class.

Similarly, the audio font output device is started by clicking a tool bar on the display 14, then the user invokes the preference setting program, and a window is displayed on display 14 as shown in FIG. 10B.

It should be noted that preference setting by word class may be added as an additional function to the window in FIG. 10A.

As shown in FIG. 10B, the word class may include a noun, a verb, an adjective, an adverb, and an imitative word, and beside the word class, there is a space for inputting the preference levels. The user may input FIGS. 1 to 10 as desired in the space as the preference levels for each word class.

In FIG. 10B, the imitative word is also provided as one word class, and the user can assign a preference level to imitative words. The imitative words imitate voices of persons, animals or natural sounds. In FIG. 10B, the preference level for imitative words is set relatively high. This is useful when expressing text as music.

When the application program 22 is started and the file 21 is selected, the application program 22 extracts the text included in the file 21, and transmits the extracted text to the rasterizer 13.

The rasterizer 13 extracts the font data corresponding to the characters constituting the text from the font data base 17, and displays the characters of a specified size at positions specified by the application program 22 with each character as an aggregation of dots.

The sound generator 10 makes reference to the dictionary 19 as shown in FIG. 9, extracts and stores the audio data and preference levels of words included in the text, and sorts the audio data in descending order of preference level. Then, the sound generator 10 generates sound source data sequentially from the sorted audio data, and outputs the sound source data sequentially through the speaker 16.

When the sound source data are stored in the dictionary 19, the sound source data can certainly be extracted directly.

If there are plural words in the text having the same preference level, the sound source data are generated in order of appearance.

It should be noted that the sound source data may be output sequentially in ascending order of preference level.

Figure 11:
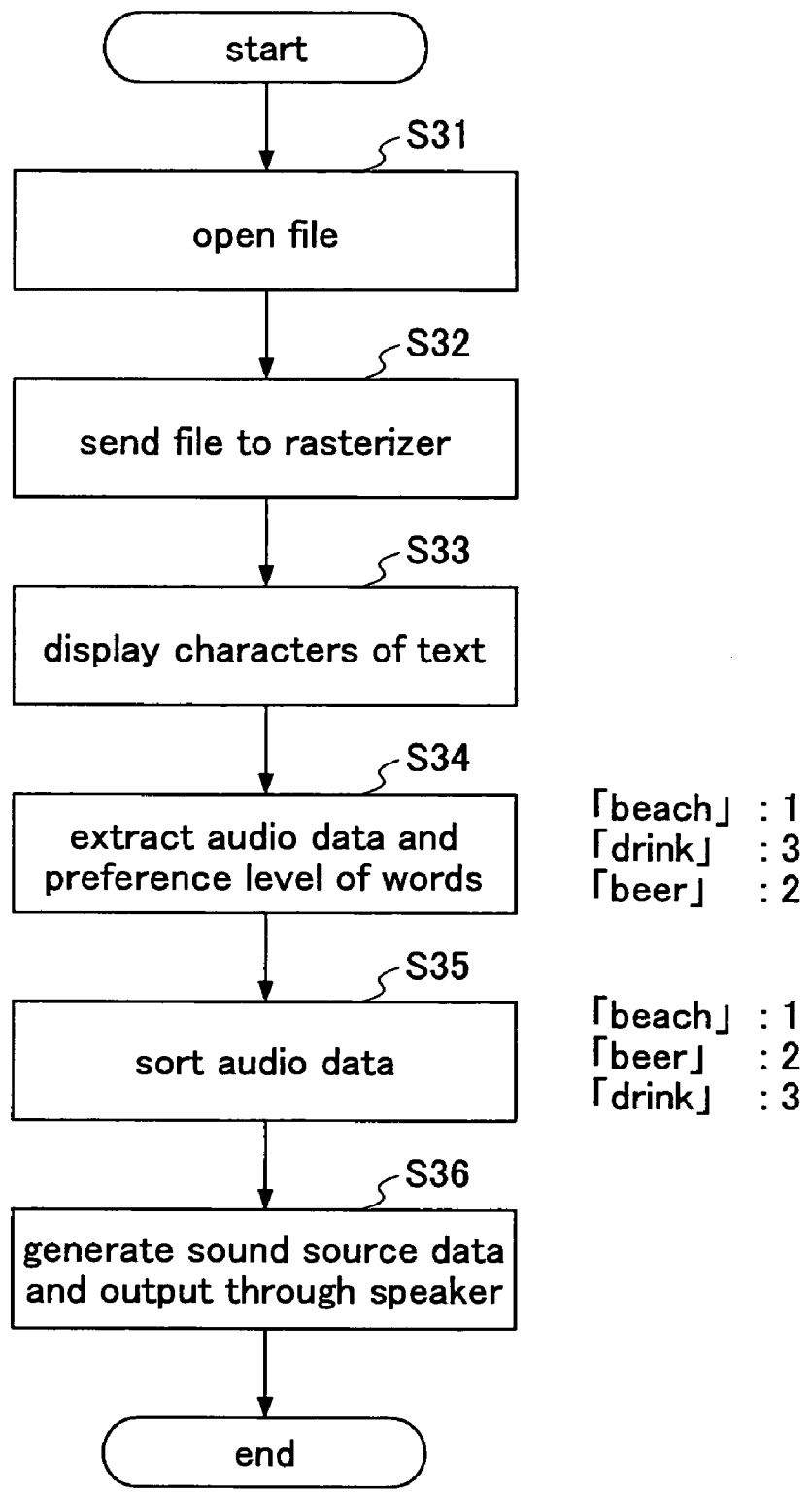
FIG. 11 is a flowchart illustrating operations of outputting sounds in order of preference level while displaying characters in an input file by the audio font output device of the present embodiment.

FIG. 11 is a flowchart illustrating operations of outputting sounds in order of preference level while displaying characters in an input file by the audio font output device of the present embodiment.

For example, the application program 22 is an electronic mail application.

In step S31, the application program 22 is invoked, and the file 21 (an electronic mail) is received and is opened.

Since the application program 22 is an electronic mail application, when an electronic mail is opened, the audio font output device of the present embodiment starts to operate.

In step S32, for example, a user selects a mail from the inbox mail list 33 with a mouse, and the codes of the characters included in the text of the file 21, namely, the selected mail, are sent to the rasterizer 13. For example, the character string in the text of the file 21 reads "Let's go to the beach tomorrow to drink beer!".

In step S33, the rasterizer 13 extracts the font data of the codes of the characters in the sentence "Let's go to the beach tomorrow to drink beer!" from the font data base 17, and forms the corresponding characters of a specified size with each character as an aggregation of dots, and displays the characters one by one on the text display area 34.

In step S34, the sound generator 10 extracts the audio data and preference levels of the words in the sentence from the dictionary 19. For example, the audio data of the words "beach" of a preference level 1, "drink" of a preference level 3, and "beer" of a preference level 2 are extracted.

In step S35, the sound generator 10 sorts the audio data of words "beach", "drink", and "beer" based on the preference levels of these words, and obtains a series of words for "beach", "beer", and "drink".

In step S36, the sound generator 10 generates sound source data from the audio data of the words "beach", "beer", and "drink", and are output sequentially from the speaker 16.

Similar to the third embodiment, for example, the sound source data are generated in such a way that a sound effect of a sea breeze is produced for the word "beach", a sound effect of drinking beer is produced for the word "beer", and a sound effect of drinking is produced for the word "drink".

These sounds are output sequentially.

As described above, although the above words appear in order of "beach", "drink", and "beer", because the preference levels are assigned to these words, a series of words "beach", "beer", and "drink" is obtained by sorting according to the preference levels. Due to this, the sounds of these words are output in order of preference level but not appearance, and this produces different sound effects of the electronic mail, making it possible for the user to grasp the contents the electronic mail more easily.

Modification

As a modification of the present embodiment, in this example, even when the preference level data are not registered in the dictionary, it is possible to change the order of outputting the sounds of words.

For example, a sentence may be analyzed grammatically, and audio data may be assigned to a subject word and a verb word, and original sounds of the subject word and the verb word may be preferentially output. For example, in a sentence "chased by a dog, a cat starts running", the subject word is "a cat", and the verb word is "starts running", thus, audio data are assigned to "a cat" and "starts running", and the sound effects of voice of a cat and running of a cat are output. This helps the user to grasp the contents of the text easily by just listening to the sounds.

When outputting sounds of words having no or weak correspondence relationship, for example, the interval between the sounds of the words may be made long; thereby, the output sounds correctly reflect the contents of the text, and the user can correctly grasp the contents of the text by listening to the sounds.

For example, in the sentence "Let's go to the beach tomorrow to drink beer!", "go" is connected with "beach", and "drink" is connected with "beer". If audio data of words "beach", "drink", and "beer" are stored in the dictionary, after the sound of "beach" is output, a time interval longer than the usual interval is provided, and then the sounds of "drink" and "beer" are output with the usual interval. In this way, by adjusting the time interval between the sounds, it is possible to understand the relationship between the words.

According to the present embodiment, because preference levels are assigned to the outputting sounds corresponding to words, it is easier to transmit the contents of text.

Fifth Embodiment

In the present embodiment, audio data corresponding to words included in an electronic mail are output as a ring alert of the electronic mail.

With a personal computer, when an electronic mail application receives an electronic mail, a predetermined sound file (WAVE or MP3) is reproduced.

With a cellular phone, when the cellular phone receives an electronic mail, the OS (Operating System) extracts predetermined sound source data such as MIDI data, and outputs the sound source data through a sound source IC. When using a cellular phone, it is possible to select sound source data according to the mail address of the sender.

In the present embodiment, instead of a ring alert sounds prepared in advance, audio data corresponding to the words included in the electronic mail are output as a ring alert sound.

Figure 12:
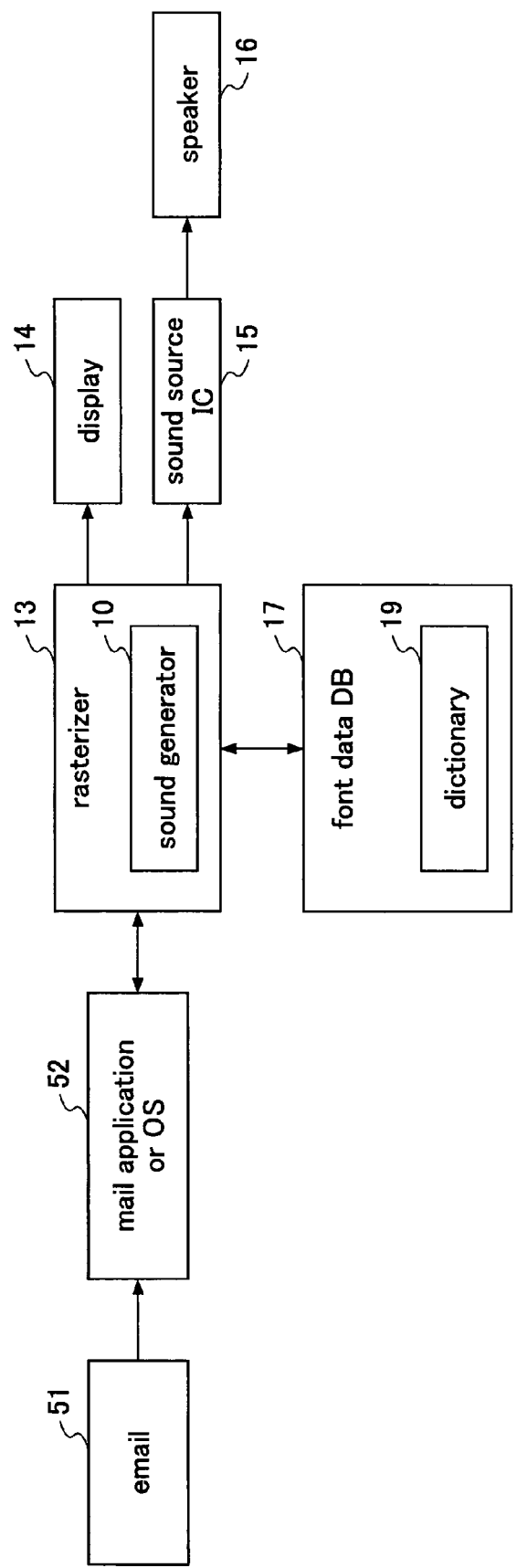
FIG. 12 is a block diagram exemplifying an audio font output device according to a fifth embodiment of the present invention.

FIG. 12 is a block diagram exemplifying an audio font output device according to a fifth embodiment of the present invention.

In the following, the same reference numbers are assigned to the same element as those described in FIG. 5, and overlapping descriptions are omitted.

As illustrated in FIG. 12, the audio font output device of the present embodiment includes a rasterizer 13 having a sound generator 10, a display 14, a sound source 15, a speaker 16, and a font data base (DB) 17 having a dictionary 19.

Data input to the audio font output device are from an electronic mail 51, instead of the file 21 in FIG. 5, and an electronic mail application 52 or an OS (Operating System) (below, they are collectively referred to as "a mail program 52") receives the electronic mail 51. That is, when using a personal computer, the mail program 52 is an electronic mail application, and when using a cellular phone, the mail program 52 is a program included in an OS for ringing alert indicating reception of a new electronic mail, or lighting a LED (Light Emission Diode).

Figure 13:
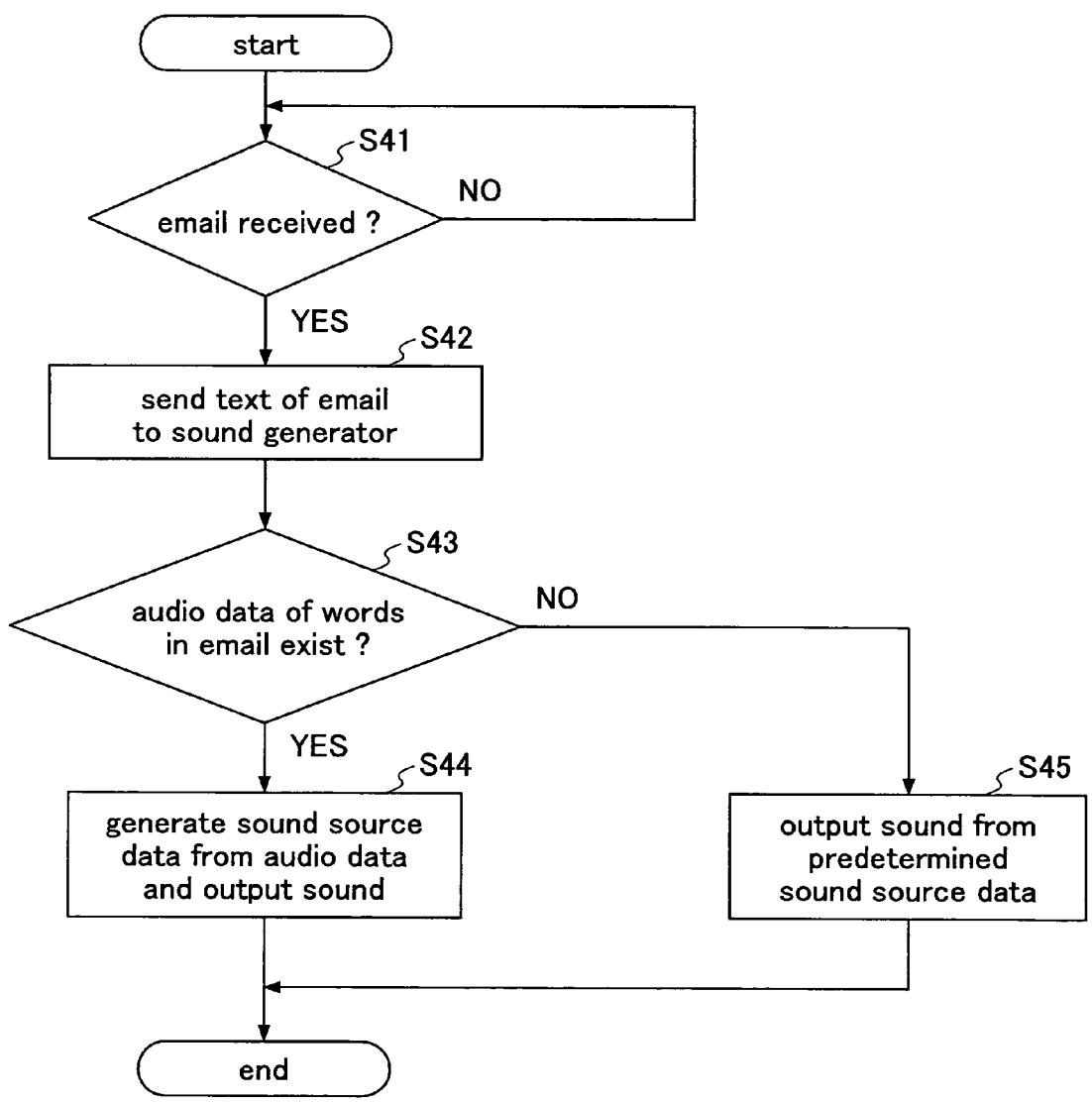
FIG. 13 is a flowchart illustrating operations of outputting audio data corresponding to the words included in an electronic mail as a ring alert sound when the audio font output device of the present embodiment receives the electronic mail.

FIG. 13 is a flowchart illustrating operations of outputting audio data corresponding to the words included in an electronic mail as a ring alert sound when the audio font output device of the present embodiment receives the electronic mail.

In FIG. 13, as an example, it is assumed that a cellular phone receives the electronic mail 51.

As shown in FIG. 13, in step S41, when the cellular phone is powered on, the mail program 52 repeatedly determines whether an electronic mail 51 is received.

In step S42, if the electronic mail 51 is received, the mail program 52 sends the text in the electronic mail 51 to the sound generator 10.

For example, the text in the electronic mail 51 reads "Let's go to the beach tomorrow to drink beer!", and this sentence is sent to the sound generator 10.

The sound generator 10 extracts the audio data corresponding to the words included in the text in the electronic mail 51 from the dictionary 19.

Here, preferential level values may be stored in the dictionary 19 in connection with the audio data as in FIG. 9, or, as in FIG. 4, the dictionary 19 does not include preferential level values. When the audio data are extracted, the audio data are stored, and a flag is set in the electronic mail, which flag indicates that the sound generator 10 has extracted the audio data. If the sound source data are stored in the dictionary 19, the sound source data can be extracted directly.

In step S43, the mail program 52 makes reference to the flag to determine whether the audio data corresponding to the words included in the electronic mail 51 exist.

If it is determined that the audio data corresponding to the words included in the electronic mail 51 exist, the routine proceeds to step 44.

If it is determined that the audio data corresponding to the words included in the electronic mail 51 do not exist, the routine proceeds to step 45.

In step S44, the sound generator 10 generates sound source data based on the stored audio data, and sends the sound source data to the sound source IC 15. The sound source IC 15 produces sounds from the speaker 16.

For example, instead of a usual ring alert sound prepared in advance, a sound effect of a sea breeze is produced for the word "beach", a sound effect of drinking is produced for the word "drink", and a sound effect of drinking beer is produced for the word "beer" are output. Namely, sounds corresponding to the words included in the electronic mail are output.

In step S45, because the audio data corresponding to the words included in the electronic mail 51 do not exist, the mail program 52 extracts the sound source data prepared in advance and sends the sound source data to the sound source IC 15. The sound source IC 15 produces sounds from the speaker 16.

It should be noted that when the audio data corresponding to the words are extracted in step S42, the sound source data may be generated directly, and then the sound source IC 15 produces sounds from the speaker 16. In this case, the sound generator 10 notifies the mail program 52 only when the audio data are not extracted.

According to the present embodiment, when an electronic mail is received, sound source data are generated and output based on the words included in the electronic mail; hence the user can predict or understand the electronic mail from the ring alert sound. Even when the audio data corresponding to the words included in the electronic mail do not exist, the sound source data prepared in advance are output as a ring alert sound to notify the user.

Sixth Embodiment

In the previous embodiments, a sound generator 10 installed in a cellular phone or a personal computer generates sound source data and outputs the sound source data.

In the present embodiment, the sound generator 10 is installed in a server, this sound generator 10 generates sound source data and sends the sound source data to a client, and the client receives and reproduces the sound source data.

Figure 14:
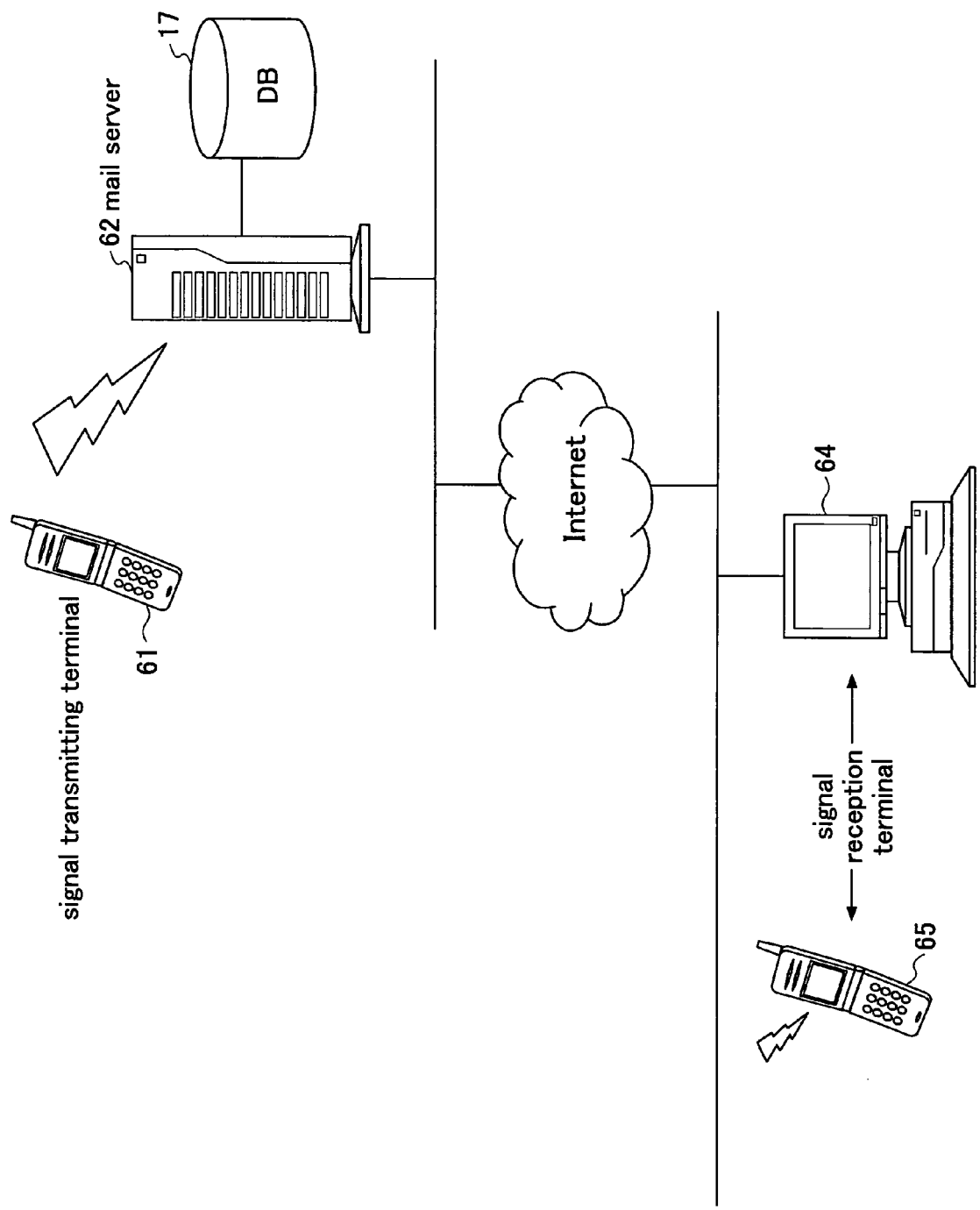
FIG. 14 is a schematic view illustrating an overall configuration of an electronic mail distribution system according to a sixth embodiment of the present invention.

FIG. 14 is a schematic view illustrating an overall configuration of an electronic mail distribution system according to a sixth embodiment of the present invention.

As shown in FIG. 14, the electronic mail distribution system includes signal transmitting terminal 61, such as a cellular phone or a PHS, a mail server 62, a personal computer 64, and a signal reception terminal 65 (below, where necessary, the personal computer 64 is also referred to as "signal reception terminal 65").

When the signals sent from the signal transmitting terminal 61, for example, an electronic mail, are received by a base station covering a specified area, the electronic mail is sent to the mail server 62 via a network (for example, the Internet) connected to the base station. The mail server 62 analyzes the address of the intended recipient of the electronic mail, and sends the electronic mail to a base station near the signal reception terminal 65 via the network, and this base station further sends the electronic mail to the signal reception terminal 65.

When sending an electronic mail to the personal computer 64, the mail server 62 sends the electronic mail to a mail server (not illustrated) of an Internet Provider with which the personal computer 64 contracts, and the mail server of the Internet Provider further sends the electronic mail to the personal computer 64.

In the present embodiment, the signal transmitting terminal 61, the personal computer 64, and the signal reception terminal 65 do not generate sound source data, but the mail server 62 generates sound source data in accordance with the text in the electronic mail, and transmits the electronic mail and the sound source data to the signal reception terminal 65. For this purpose, the mail server 62 is configured to have the font data base (DB) 17.

Sometimes, the sender does not desire to send the sound source data. To meet this requirement, in the present embodiment, when the sender is to send the electronic mail to the signal reception terminal 65, the mail server 62 is so configured that the sender is able to request the mail server 62 to send or not send the sound source data to the signal reception terminal 65. For example, when the sender desires to request the mail server 62 to send the sound source data to the signal reception terminal 65, the sender may simply press a button provided by a mail application program in the signal transmitting terminal 61.

When the sender issues an instruction, for example, the sender presses the button, and the mail application program in the signal transmitting terminal 61 sends an electronic mail to the mail server 62 together with a request of attaching a sound. For example, the sound attaching request may be described between specified tags, like an HTML (registered trademark) mail, or may be made by attaching special symbols to the end of the "subject" portion of a header of the electronic mail, so that the sound source data are sent as an attachment.

When the recipient does not desire to receive the sound source data, the mail server 62 may be set in advance for this purpose.

Figure 15:
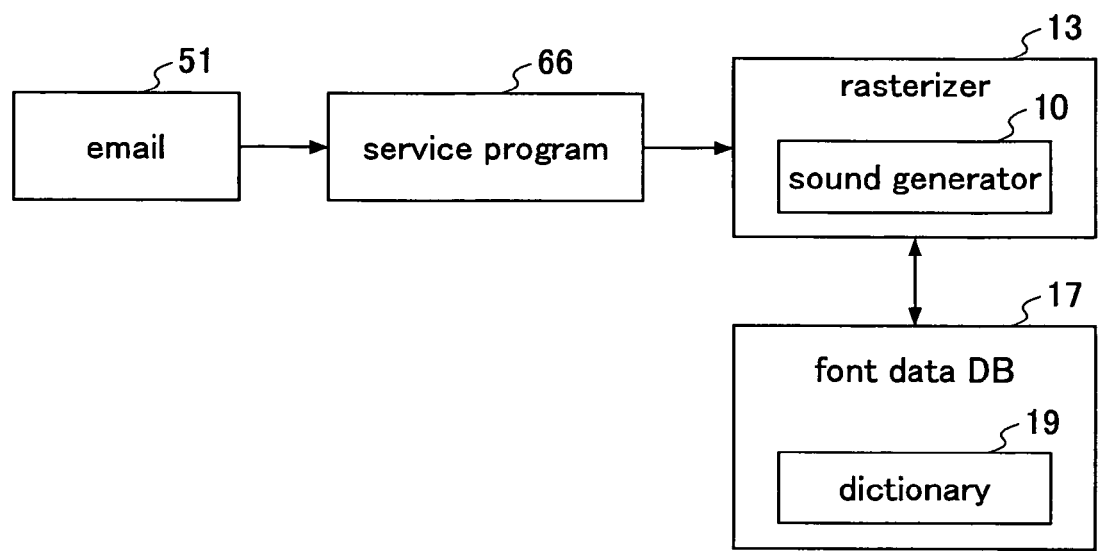
FIG. 15 is a block diagram exemplifying an audio font output device according to the sixth embodiment of the present invention in the mail server 62.

FIG. 15 is a block diagram exemplifying an audio font output device according to the sixth embodiment of the present invention in the mail server 62.

In the following, the same reference numbers are assigned to the same element as those described in the previous embodiments, and overlapping descriptions are omitted.

As illustrated in FIG. 15, the audio font output device of the present embodiment includes a rasterizer 13 having a sound generator 10, and a font data base (DB) 17 having a dictionary 19.

A service program 66 extracts the text of the electronic mail 51, and attaches generated sound source data to the original electronic mail 51.

For example, the service program 66 may the well-known software "Sendmail" (registered trademark). In the service program 66, the sound source data are generated in the same way as described in the second embodiment, the fourth embodiment, and the fifth embodiment.

Figure 16:
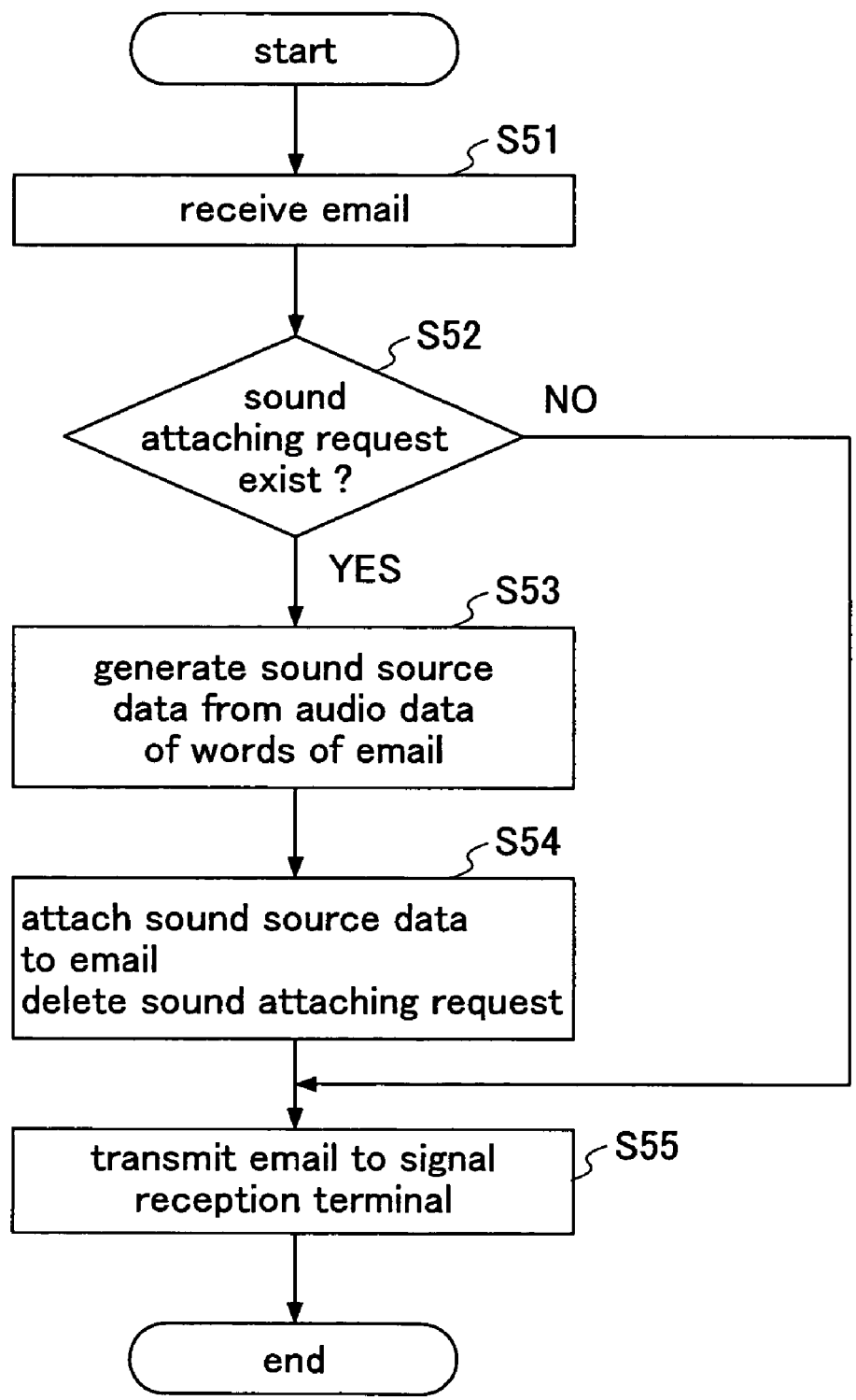
FIG. 16 is a flowchart illustrating operations of an audio font output device in the mail server to generate the sound data.

FIG. 16 is a flowchart illustrating operations of an audio font output device in the mail server 66 to generate the sound data.

As shown in FIG. 16, in step S51, the mail program 66 receives the electronic mail 51.

For example, the text in the electronic mail 51 reads "Let's go to the beach tomorrow to drink beer!", In step S52, the mail server 66 determines whether the sound attaching request is to be sent together with the electronic mail 51.

If it is determined that the sound attaching request is to be sent together with the electronic mail 51, the routine proceeds to step 53.

If it is determined that the sound attaching request is not to be sent together with the electronic mail 51, the routine proceeds to step 55.

In step S53, because the sound attaching request is to be sent together with the electronic mail 51, the service program 66 extracts the text of the electronic mail 51, and sends the text to the sound generator 10.

The sound generator 10 extracts the audio data corresponding to the words included in the text in the electronic mail 51 from the font data base DB 17, and generates sound source data based on the audio data. As described above, the sound source data produce the sound effects of sea breeze, drinking, and drinking beer.

Because the font data base 17 of the mail server 62 can be of a large capacity, the sound source data corresponding to the words may be generated directly.

In step S54, the service program 66 attaches the sound source data to the original electronic mail 51, and deletes the sound attaching request from the electronic mail 51. Since the sound attaching request is deleted, it is possible to prevent sending unnecessary information to the signal reception terminal 65.

The service program 66 transmits the electronic mail 51 with the attached sound source data to the mail software.

In step S55, the service program 66 transmits the electronic mail 51 to the mail software, and the electronic mail 51 is transmitted to the signal reception terminal 65.

In this way, both the electronic mail 51 and the sound source data are sent to the signal reception terminal 65.

Figure 17:
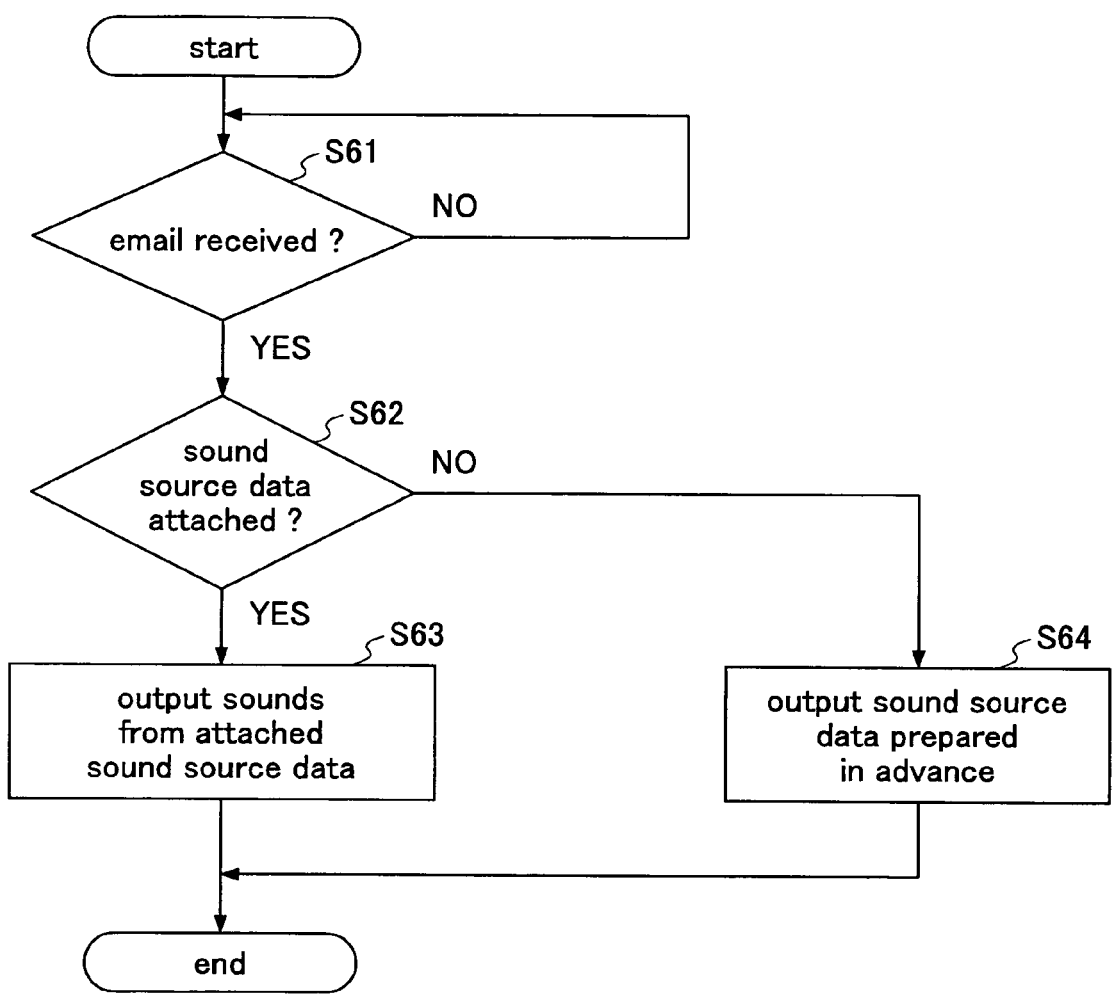
FIG. 17 is a flowchart illustrating operations of the signal reception terminal for receiving both the electronic mail and the sound source data, and outputting a sound as a ring alert sound.

FIG. 17 is a flowchart illustrating operations of the signal reception terminal 65 for receiving both the electronic mail 51 and the sound source data, and outputting a sound as a ring alert sound.

For example, the signal reception terminal 65 is a cellular phone.

As shown in FIG. 17, in step S61, when the cellular phone is powered on, the mail program of the signal reception terminal 65 repeatedly checks whether electronic mail 51 is received.

In step S62, if electronic mail 51 is received, the mail program of the signal reception terminal 65 confirms whether sound source data are attached to the electronic mail 51. For example, this confirmation may be made by determining whether a file of a specified extension is attached.

If it is determined that the sound source data are attached to the electronic mail 51, the routine proceeds to step 63.

If it is determined that the sound source data are not attached to the electronic mail 51, the routine proceeds to step 64.

In step S63, since the sound source data are attached to the electronic mail 51, the mail program of the signal reception terminal 65 outputs sounds from the attached sound source data.

For example, from the speaker of the signal reception terminal 65, instead of a usual ring alert sound prepared in advance, sound effects of a sea breeze, drinking, and drinking beer are produced. Namely, a ring alert sound corresponding to the contents of the electronic mail is output, and this enables the user to easily grasp the contents of the electronic mail.

In step S64, since the sound source data are not attached to the electronic mail 51, the mail program of the signal reception terminal 65 extracts the sound source data prepared in advance and sends the sound source data to the sound source IC 15. The sound source IC 15 produces sounds from the speaker 16.

In the above, the attached sound source data are output as the ring alert sound. However, even when sound source data are attached, the sound source data prepared in advance can be output as the ring alert sound, or the originally attached sound source data when the electronic mail 51 is opened can be output.

According to the present embodiment, neither the signal transmitting terminal 61 nor the signal reception terminal 65 need have the audio font output device, and it is possible to output sounds corresponding to the contents of an electronic mail 51 to the signal reception terminal 65. The recipient can grasp the contents of the electronic mail 51 by just listening to the sounds.

Hardware Configuration

Figure 18:
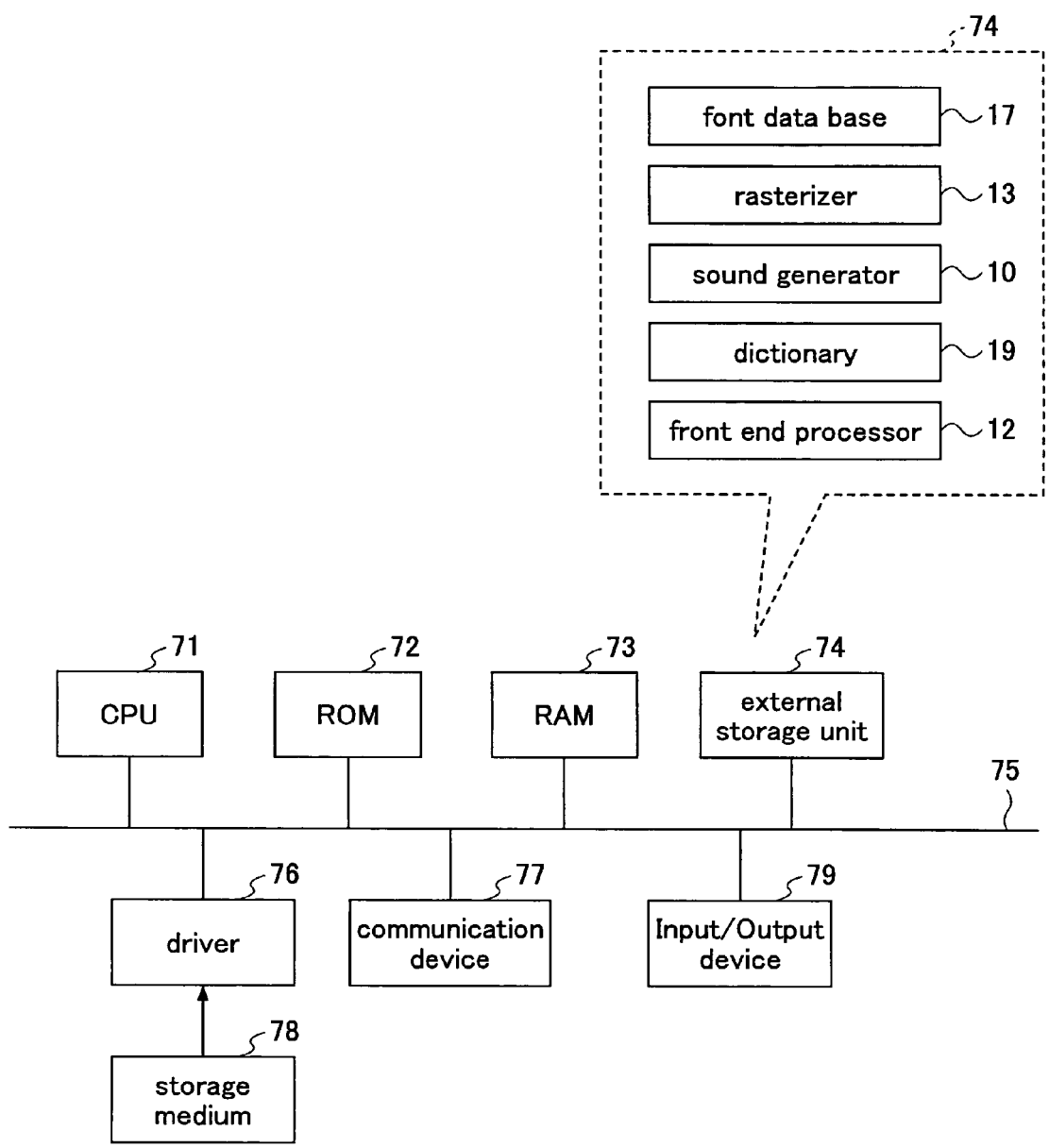
FIG. 18 is a block diagram illustrating an example of a hardware configuration including the audio font output device of the present invention.

FIG. 18 is a block diagram illustrating an example of a hardware configuration including the audio font output device of the present invention.

The hardware configuration, for example, is the same as that of a computer or a cellular phone. It includes a CPU (Central Processing Unit) 71, for controlling parts of the system, a ROM (Read Only Memory) 72 for storing BIOS, a RAM (Random Access Memory) 73 serving as a working area for allocating various temporary data, a flash memory or a Hard Disk (HDD) or other external storage unit 74, a driver 76 for reading from and writing to a storage medium 78 such as a CD (Compact Disk)-RW, a memory card, a communication device 77 for connecting to a cellular phone network or a LAN (Local Area Network), and an Input/Output device 79. The above components are connected by a bus 75.

The Input/Output device 79 corresponds to an input device receiving input data by using a key board, a mouse, the display 14, the sound source IC 15, or the speaker 16.

Programs functioning as a symbol display unit or a sound source generation unit are stored in the external storage unit 74, the CPU 72 executes these programs to realize the symbol display unit (rasterizer 13), the front end processor 12, and the sound source generation unit (sound generator 10). The font data base (DB) 17 and the dictionary 19 are stored in the external storage unit 74. The application 22, the mail program 52, and the service program 66 are also stored in the external storage unit 74.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2005-120376 filed on Apr. 18, 2005 and No. 2006-0632238 filed on Mar. 8, 2006, and the entire contents of which are hereby incorporated by reference.

What is claimed is:

1. An audio font output device, comprising:
an inputting unit that receives a plurality of codes;
a language input front end processor that transforms the plurality of input codes into a sentence including characters or symbols by choosing from a dictionary based on a predetermined character code system;
a font data base that stores a picture data for each of a plurality characters or symbols corresponding to the plurality of codes, and an audio data corresponding to each of the plurality of codes, said audio data including a musical information reflecting a meaning of the character or the symbol, wherein audio reproduced using said audio data is different from an audible pronunciation of the character or the symbol itself;
a display unit that displays the character or the symbol based on the picture data corresponding to each of the plurality of input codes; and
an audio output unit that outputs an audio signal based on the audio data corresponding to each of the plurality of input codes,
wherein the audio data corresponding to the characters or the symbols are output sequentially in order of preference level set for each of word classes, said word classes including a noun, a verb, an adjective, and an imitative word, and
wherein an interval between audio data corresponding to the characters or the symbols may be adjusted when said audio data corresponding to the characters or the symbols have no or weak correlation,
when a user selects a first timing mode via a user interface, the audio output unit outputs the audio signal based on the audio data each time each of the characters is displayed on the display unit, and
when the user selects a second timing mode via the user interface, the audio output unit outputs the audio signal based on the audio data for each of the characters included in the input sentence after a period is input.

2. The audio font output device as claimed in claim 1, further comprising:
a sound source data generation unit that extracts the audio data corresponding to each of the plurality of input codes and generates a sound source data used for outputting the audio signal when the plurality of input codes are input;
wherein the audio output unit outputs the audio signal based on the sound source data generated by the sound source data generation unit.

3. The audio font output device as claimed in claim 1, wherein the inputting unit is a character input unit.

4. The audio font output device as claimed in claim 1, wherein the plurality of codes are input from a data file of an application program via the inputting unit.

5. The audio font output device as claimed in claim 1, wherein the musical information includes intervals, lengths, strengths, and variation patterns of each sound.

6. The audio font output device as claimed in claim 1, wherein the preference level for the imitative word is higher than that of any other word classes.

7. The audio font output device as claimed in claim 1, wherein when there are plural characters or symbols in the sentence having the same preference level, the audio data corresponding to the characters or the symbols are output in order of appearance.

8. An audio font output device, comprising:
an inputting unit that receives a plurality of first codes and second codes;
a language input front end processor that transforms the plurality of input second codes into a sentence including characters by choosing from a dictionary based on a predetermined character code system;
a font data base that stores a picture data for each of a plurality characters or symbols corresponding to each of the plurality of first codes, and an audio data corresponding to each of the plurality of second codes for a word, said word being formed from a plurality of the respective characters or the respective symbols, said audio data including musical information reflecting a meaning of the word, wherein audio reproduced using said audio data is different from an audible pronunciation of the word itself;
a display unit that displays the character or the symbol based on the picture data corresponding to each of the plurality of input first codes; and
an audio output unit that outputs an audio signal based on the audio data corresponding to each of the plurality of input second codes,
wherein the audio data corresponding to the characters or the symbols are output sequentially in order of preference level set for each of word classes, said word classes including a noun, a verb, an adjective, and an imitative word, and
wherein an interval between audio data corresponding to the characters or the symbols may be adjusted when said audio data corresponding to the characters or the symbols have no or weak correlation,
when a user selects a first timing mode via a user interface, the audio output unit outputs the audio signal based on the audio data each time each of the characters is displayed on the display unit, and
when the user selects a second timing mode via the user interface, the audio output unit outputs the audio signal based on the audio data for each of the characters included in the input sentence after a period is input.

9. The audio font output device as claimed in claim 8, further comprising:
a sound source data generation unit that extracts the audio data corresponding to each of the plurality of input second codes and generates a sound source data used for outputting the audio signal when the plurality of second codes are input;
wherein the audio output unit outputs the audio signal based on the sound source data generated by the sound source data generation unit.

10. The audio font output device as claimed in claim 9, further comprising:
a signal reception unit that receives an electronic mail including the plurality of second codes; and
a determination unit that determines whether the audio data corresponding to one of the plurality of second codes included in the electronic mail is stored in the font database;
wherein
the audio output unit outputs the audio signal as a ring alert of the electronic mail based on the sound source data when the audio data corresponding to one of the plurality of second code codes included in the electronic mail is stored in the font data base, and the audio output unit outputs the ring alert of the electronic mail when the audio data corresponding to the one of the plurality of second codes included in the electronic mail is not stored in the font data base.

11. The audio font output device as claimed in claim 8, wherein the inputting unit is a character input unit and the plurality of second codes are input via the character input unit.

12. The audio font output device as claimed in claim 8, wherein the plurality of second codes are input from a data file of an application program via the inputting unit.

13. The audio font output device as claimed in claim 12, wherein the preferential levels set for each of the word classes are stored in the font data base, and the audio output unit outputs the audio signal in descending order of the preferential levels set for each of the word classes.

14. A mail server that sends an electronic mail received from a signal transmission terminal through a network to a signal reception terminal through the network, said mail server comprising:

a data base that stores an audio data corresponding to each of a plurality of codes for words in a dictionary based on a predetermined character code system, each of said words being formed from a plurality of characters or symbols and said audio data including musical information reflecting a meaning of the word, the words forming a sentence, wherein audio reproduced using said audio data is different from an audible pronunciation of the word itself;

an audio data attaching unit that generates a sound source data based on the audio data or extracts the sound source data corresponding to one of the plurality of words, and attaches the sound source data to the electronic mail; and a transmission unit that transmits the electronic mail with the attached sound source data to the signal reception terminal, wherein the audio data corresponding to the characters or the symbols are output sequentially in order of preference level set for each of word classes, said word classes including a noun, a verb, an adjective, and an imitative word, and wherein an interval between audio data corresponding to the characters or the symbols may be adjusted when said audio data corresponding to the characters or the symbols have no or weak correlation, when a user selects a first timing mode via a user interface, the audio signal based on the audio data is output each time each of the characters is displayed, and when the user selects a second timing mode via the user interface, the audio signal based on the audio data is output for each of the characters included in the input sentence after a period is input.

15. The mail server as claimed in claim 14, wherein the signal transmission terminal sends a request for attaching the sound source data together with the electronic mail.

16. The mail server as claimed in claim 14, wherein the signal reception terminal rings based on the sound source data as a ring alert of the electronic mail when the received electronic mail has the sound source data attached.

* * * * *